United States Patent
Morris et al.

(10) Patent No.: US 7,537,224 B2
(45) Date of Patent: May 26, 2009

(54) CAM TUBE BRACKET

(75) Inventors: Jeff Morris, Stow, OH (US); Phillippi R. Pierce, Canton, OH (US); Jay D. White, Massillon, OH (US); Dane Gregg, Uniontown, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 301 days.

(21) Appl. No.: 11/548,933

(22) Filed: Oct. 12, 2006

(65) Prior Publication Data

US 2007/0140782 A1    Jun. 21, 2007

Related U.S. Application Data

(60) Provisional application No. 60/725,933, filed on Oct. 12, 2005.

(51) Int. Cl.
*B60G 9/00* (2006.01)
(52) U.S. Cl. .............. 280/124.116; 280/124.1; 280/124.11; 280/124.128; 280/124.157
(58) Field of Classification Search .............. 280/124.1, 280/124.11, 124.116, 124.128, 124.157
See application file for complete search history.

(56) References Cited

U.S. PATENT DOCUMENTS

| | | | | |
|---|---|---|---|---|
| 4,174,855 | A * | 11/1979 | Vandenberg | 280/124.156 |
| 4,277,111 | A * | 7/1981 | Gray et al. | 384/124 |
| 4,828,089 | A * | 5/1989 | Collins et al. | 192/70.12 |
| 5,174,680 | A | 12/1992 | Nakamura et al. | |
| 5,226,509 | A * | 7/1993 | Smith | 188/1.11 W |
| 5,951,198 | A | 9/1999 | Phillips | |
| 6,240,806 | B1 * | 6/2001 | Morris et al. | 74/567 |
| 6,390,263 | B1 * | 5/2002 | Arhab | 192/3.29 |
| 6,988,605 | B2 * | 1/2006 | Senger et al. | 192/103 F |

(Continued)

FOREIGN PATENT DOCUMENTS

CA    1256811    7/1989

(Continued)

OTHER PUBLICATIONS

KLL Cam Tube Bracket, Aug. 19, 2002.

*Primary Examiner*—D. Glenn Dayoan
*Assistant Examiner*—Barry Gooden, Jr.
(74) *Attorney, Agent, or Firm*—Krugliak, Wilkins, Griffiths & Dougherty Co., L.P.A.; David P. Dureska; Brent L. Moore (57) ABSTRACT

A cam shaft support/enclosure assembly for brake systems of heavy-duty vehicles is mounted on a beam of an axle/suspension system and includes a cam tube. A bracket for mounting the cam tube on the beam includes a pair of plates that are mounted on the beam. Each one of the plates is formed with an opening for receiving the cam tube and includes at least three tabs, and preferably four tabs, that extend outwardly from each respective plate adjacent the opening and contact the outer surface of the cam tube. Each tab includes a generally arched and optionally textured face for mating with an outer surface of the cam tube, which may also be optionally textured, so that when the plates are mounted the tabs engage the cam tube in a press-type fit, minimizing movement of the cam tube.

6 Claims, 9 Drawing Sheets

U.S. PATENT DOCUMENTS

| | | | |
|---|---|---|---|
| 7,077,783 B2 * | 7/2006 | Senger et al. | 477/98 |
| 2002/0042970 A1 * | 4/2002 | Liao | 16/337 |
| 2004/0129096 A1 * | 7/2004 | Vilou et al. | 74/7 C |
| 2005/0115788 A1 * | 6/2005 | Ackermann et al. | 192/3.29 |
| 2006/0219498 A1 * | 10/2006 | Organek et al. | 188/161 |
| 2006/0244234 A1 * | 11/2006 | Ramsey | 280/124.131 |

FOREIGN PATENT DOCUMENTS

| | | |
|---|---|---|
| GB | 2238834 A | 12/1991 |
| WO | 9109235 A1 | 6/1991 |
| WO | 0118422 A1 | 3/2001 |

* cited by examiner

CAM TUBE BRACKET

CROSS-REFERENCE TO RELATED APPLICATION

This application claims the benefit of U.S. Provisional Patent Application Ser. No. 60/725,933, filed Oct. 12, 2005.

BACKGROUND OF THE INVENTION

1. Technical Field

The invention relates to brake systems of heavy duty vehicles, and in particular to cam assemblies of the brake system. More particularly, the invention is directed to a cam tube bracket for a cam shaft support/enclosure assembly which enables efficient installation, increases load capacity, and offers increased resistance to torsional and axial deflection of a cam tube of the cam shaft support/enclosure assembly, thus reducing fretting and providing a more secure attachment of the cam tube to a suspension assembly, as well as extending the life of the cam shaft support/enclosure assembly.

2. Background Art

In conventional heavy duty vehicle brake systems, an S-cam is utilized to lift brake shoes against a brake drum to decelerate a vehicle. The S-cam is integrally connected to a cam shaft, which typically is supported at each of its ends by a bushing or bearing. These bushings usually are lubricated or greased to reduce friction between the bushings and the cam shaft.

If the bushings or the cam shaft become worn and/or rotational friction of the cam shaft against the bushings increases, the overall efficiency of the brake system decreases. Of course, when bushing or cam shaft wear exceeds predetermined limits, bushing and/or cam shaft replacement is required. Recommended practice in the industry is that when the cam shaft and/or bushings on one end of an axle require replacement, then the cam shaft and/or bushings on the other end of the same axle should also be replaced, and the cam shafts and/ox bushings on all other axles of the vehicle should be inspected for the same wear condition There are two primary contributors to cam shaft and bushing wear, namely, load-induced wear and contamination-induced wear Wear due to loading is encountered in two different conditions that can be defined as quasi-static and dynamic. The quasi-static case occurs when the vehicle brakes are applied and braking forces are reacted in the cam shaft bushings. This scenario is considered quasi-static due to the relatively low rotational speed of the cam shaft and the steady state condition when the brakes are held at constant pressure. In such a case, the loads on the outboard bushing are greater than on the inboard bushing The dynamic load case, on the other hand, typically occurs when the brakes are in the released condition and the cam shaft experiences vibrations due to road inputs. These vibrations result in impact loading of the cam shaft against the bushings Cam shaft and bushing wear due to contamination is caused primarily by environmental factors. To reduce such contamination, seals generally are disposed on each end of each bushing, which capture the lubricant inside the bushings and limit ingress of contaminants from the outside environment. The lubricant not only acts to reduce friction between the cam shaft and the bushings, but also suspends any contaminants that may migrate past the seals into the bushing The lubricant also acts as a barrier to moisture that could cause corrosion of the cam shaft Thus, various types of cam shaft support/enclosure assemblies have been utilized in the brake system art to protect and support the cam shaft, and to ensure coaxiality of the bushings to prevent excessive rotational friction and/or binding of the cam shaft against one or more of the bushings when the brakes are actuated Maintaining coaxiality of the bushings also improves the load support of the bushings. More particularly, when the bushings remain coaxial, loads ale more evenly distributed across the surfaces of both bushings and there is a reduced chance of the cam shaft contacting a small area or edge of one of the bushings. Such support increases the load-bearing area available for the cam shaft, thus reducing bushing wear due to quasi-static and dynamic load conditions Such a cam shaft support/enclosure assembly also protects the bushings from environmental contamination One such type of cam shaft support/enclosure assembly includes a cam tube, and the cam tube eliminates two seals over bushings that are used without a cam tube, and reduces by two the number of locations for ingress of contaminants into the bushings. The cam tube also provides a larger grease reservoir to improve lubricity and to suspend any contaminants that may migrate past the seals.

However, prior art cam shaft support/enclosure assemblies typically have required a weld at the attachment point of the inboard end of the cam tube to the vehicle to react rotation of the tube induced by cam shaft rotation Unfortunately, such a weld can be subject to fatigue and failure Moreover, due to the requirement of such welding, and/or potential shimming during installation of the cam tube support/enclosure assembly during production of an axle/suspension system, the cam shaft support/enclosure assembly typically must be custom fit to a single type of axle/suspension system More specifically, different axle/suspension systems have different distances between the two major support points for the cam shaft support/enclosure assembly, namely, the brake system spider and the beam of the axle/suspension system Thus, one size of cam shaft support/enclosure assembly with fixed weld points may fail to fit many axle/suspension systems. In addition, custom-fitting may also be required on same-type axle/suspension systems due to small tolerances in the distance between the support points for the cam tube caused by natural variations in manufacturing processes In an effort to overcome the limitations associated with welding, it is known in the art to use a cam tube support plate or bracket formed with a predetermined keyhole configuration, such as a D-shape, in conjunction with an O-ring to grip the cam tube and minimize or prevent cam tube rotation. The cam tube support plate keyhole configuration matches the configuration of the periphery of the inboard end of the cam tube The cam tube support plate reacts to cam tube rotation and thus eliminates the possibility of fatigue to and failure of a weld The keyhole slip fit between the cam tube and support plate further enables installation of the cam tube on different types of axle suspension systems, where the distance between the brake spider and inboard suspension assembly point of support for the cam tube varies, as well as on same-type suspension assemblies without concern for differing distances between the support points caused by natural variations in manufacturing processes However, as the O-ring used in connection with such support plates ages, it can become less effective in gripping the cam tube and preventing its rotation In addition, the cam tube support plate keyhole configuration interface with the cam tube may not be enough to secure the cam tube, so relative movement may occur at both the cam-tube-to-suspension-assembly and cam-tube-to-brake-spider interfaces, depending on the condition of certain cam shaft support/enclosure assembly components, such as the O-ring This combined possible failure to satisfactorily limit relative movement of the cam tube may cause undesirable wear on component contact surfaces that, if not corrected, can result in the need to replace the worn components The present invention solves the above-described problems of possible fatigue failure and custom-fitting by utilizing an improved inboard cam tube support plate or bracket having a generally concave shape prior to assembly, and three or more extruded tabs to create a spring effect and thus exert radial forces on the cam tube, with improved force distribution to secure the cam tube. In addition, the plurality of bracket extruded tabs may be roughened, which in turn adds to the frictional interface between the bracket and cam tube, resulting in increased load capacity and resistance to torsional and axial deflection of the cam tube and reduced fretting Optionally, fewer than three extruded tabs, which include roughened or textured faces, may be utilized without affecting the overall concept or performance of the invention. The present invention provides a more secure attachment of the cam tube to the suspension assembly, and also extends the life of the cam shaft support/enclosure assembly

SUMMARY OF THE INVENTION

An objective of the present invention is to provide an improved cam tube bracket which increases resistance to cam tube movement induced by loads placed on the axle/suspension system during operation of the vehicle, as well as from loads caused by operation of the brake system, and increases load capacity of the cam shaft support/enclosure assembly, resulting in reduced fretting at the cam tube-bracket interface, so that the cam tube is more securely attached Still another objective of the present invention is to provide a cam tube bracket that is free of welds, thus facilitating mounting of its associated cam shaft support/enclosure assembly components on various types of axle/suspension systems having differing distances between the brake system spider and the suspension assembly beam, without custom fitting the cam shaft support/enclosure assembly, as well as facilitating mounting on same-type suspension assemblies where manufacturing tolerances may create different distances between the support points for the cam shaft support/enclosure assembly A further objective of the present invention is to provide such a cam tube bracket that is free of additional gripping components, such as an O-ring, for increasing resistance to cam tube movement.

A still further objective of the present invention is to provide such a cam tube bracket which facilitates efficient assembly of the cam shaft support/enclosure assembly in a production environment, and which is durable in use and cost-effective to install and maintain.

These objectives and advantages are obtained by the bracket for a cam tube of a brake system cam shaft support/enclosure assembly of the present invention The cam shaft support/enclosure assembly is attached to an axle/suspension system of a heavy-duty vehicle and includes at least one plate mounted on the axle/suspension system. The plate is formed with an opening for receiving the cam tube, and includes at least one tab that extends from the plate adjacent the opening. The tab has a face for mating with an outer surface of the cam tube A selected one of the tab face and the cam tube outer surface has a surface texture, which minimizes movement of the cam tube.

These objectives and advantages are also obtained by the bracket for a cam tube of a brake system cam shaft support/enclosure assembly of the present invention. The cam shaft support/enclosure assembly is attached to an axle/suspension system of a heavy-duty vehicle and includes at least one plate mounted on the axle/suspension system. The plate is formed with an opening for receiving the cam tube. At least three tabs extend from the plate adjacent the opening. Each one of the tabs has a face for mating with an outer surface of the cam tube, which minimizes movement of the cam tube.

BRIEF DESCRIPTION OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENTS

Figure 1:
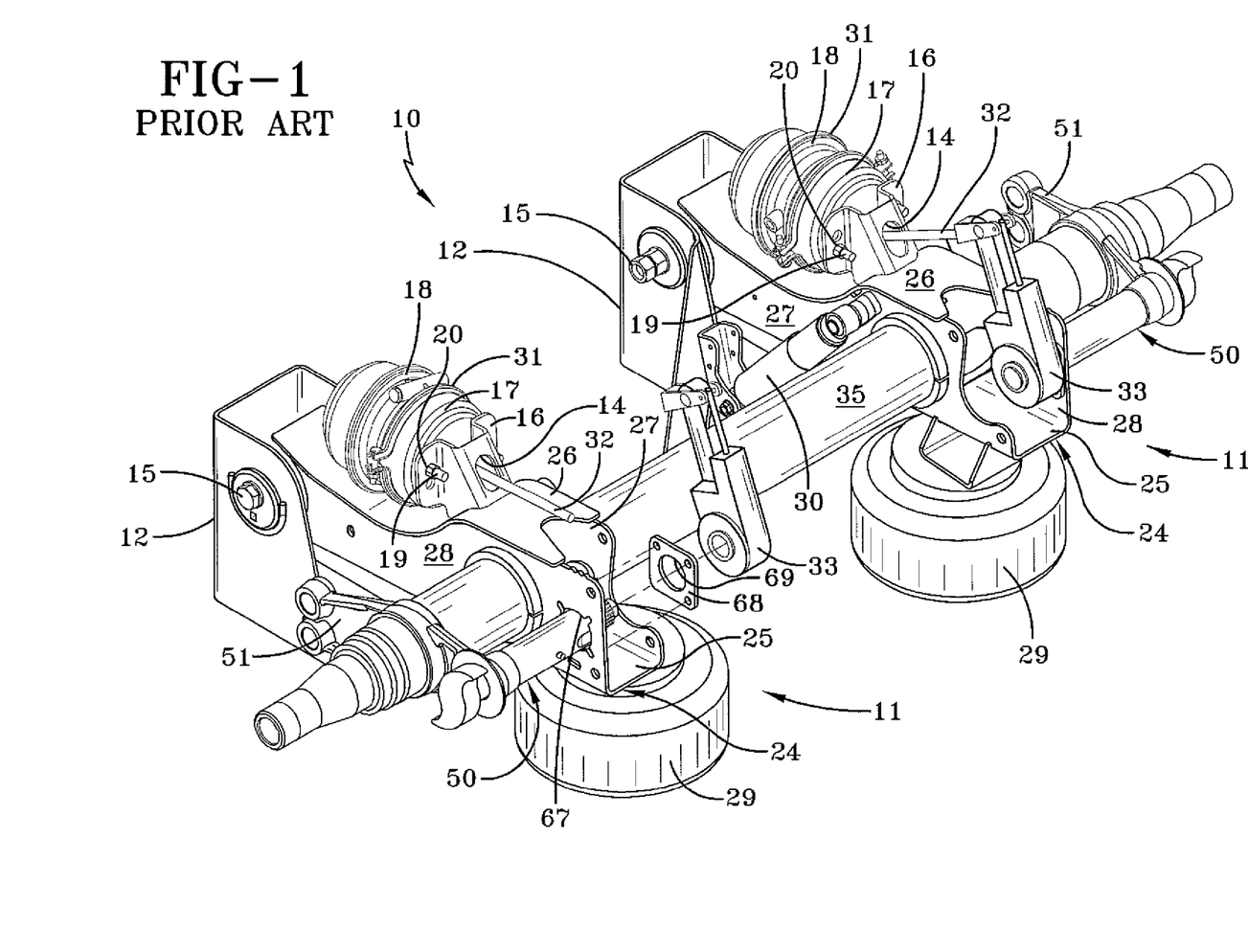
FIG. 1 is an inverted, partially exploded perspective view of an axle/suspension system of the type useful in a heavy-duty vehicle, such as the trailer of a semi-trailer, and showing a prior art cam shaft support/enclosure assembly mounted on each end of the axle/suspension system.

With reference to FIG. 1, so that the structure, operation and advantages of the improved cam tube bracket of the present invention can be best understood, a prior art cam shaft support/enclosure assembly for a heavy duty vehicle now will be described in the environment in which it is utilized, namely, with a heavy-duty vehicle axle/suspension system 10. Inasmuch as axle/suspension system 10 includes generally identical suspension assemblies 11, each suspended from a respective one of a pair of hangers 12, only one of the suspension assemblies will be described herein.

In particular; hanger 12 is, by any suitable means, securely mounted on and depends from the underside of the trailer of a heavy duty vehicle, such as a semi-trailer or a full trailer (not shown). A bushing (not shown) is pivotally mounted on hanger 12 by any suitable means such as a fastener 15. The bushing preferably is of the type having multi-functional characteristics. More specifically, the multi-functional characteristics of the bushing include required load and deflection ratios, or static rates, of varying levels in different directions for semi-trailer axle/suspension system applications. The bushing static late is stiff in the horizontal radial direction, so that axle/suspension system 10 remains substantially perpendicular to the direction of movement of the semi-trailer despite horizontal loading which may be placed on the axle/suspension system, and relatively soft in the vertical radial direction, to enable the suspension system and bushing to absorb vertical loading shocks and provide a smooth ride for the vehicle occupants and any cargo carried by the vehicle.

The front end of a trailing arm or beam 24 in turn is rigidly attached to a mounting tube (not shown) containing the bushing by any suitable means such as welding. Beam 24 generally is rectangular-shaped and includes spaced-apart top and bottom walls 25 and 26, respectively, and spaced-apart inboard and outboard sidewalls 27 and 28, respectively. Top wall 25 is formed integrally with sidewalls 27,28 to form an inverted generally U-shaped structure. Bottom wall 26 extends between, is welded to, and interconnects sidewalls 27,28 An air spring 29 is suitably mounted on and extends between the upper surface of the tear end of top wall 25 and the underside of the vehicle. A shock absorber 30 extends between and is mounted on inboard sidewall 27 of suspension beam 24 and hanger 12.

A dual brake chamber 31 of the vehicle braking system is mounted on a bracket 16, which in turn is mounted on and depends from bottom wall 26 of suspension beam 24, by passage of a piston rod 32 of dual chamber 31 through an opening 14 formed in the bracket Fasteners 19 formed integrally with a service brake chamber 17, are passed through openings 20 formed in bracket 16 to secure dual brake chamber 31 to the bracket. Dual brake chamber 31 includes service brake chamber 17 and a parking brake chamber 18 Brake chamber piston 32 in turn is pivotally attached to a slack adjuster 33.

An axle 35 extends between and is immovably captured in suspension beam 24 and its corresponding opposite suspension beam of axle/suspension system 10. A set of wheels/tires (not shown) is mounted on each end of axle 35.

Figure 6:
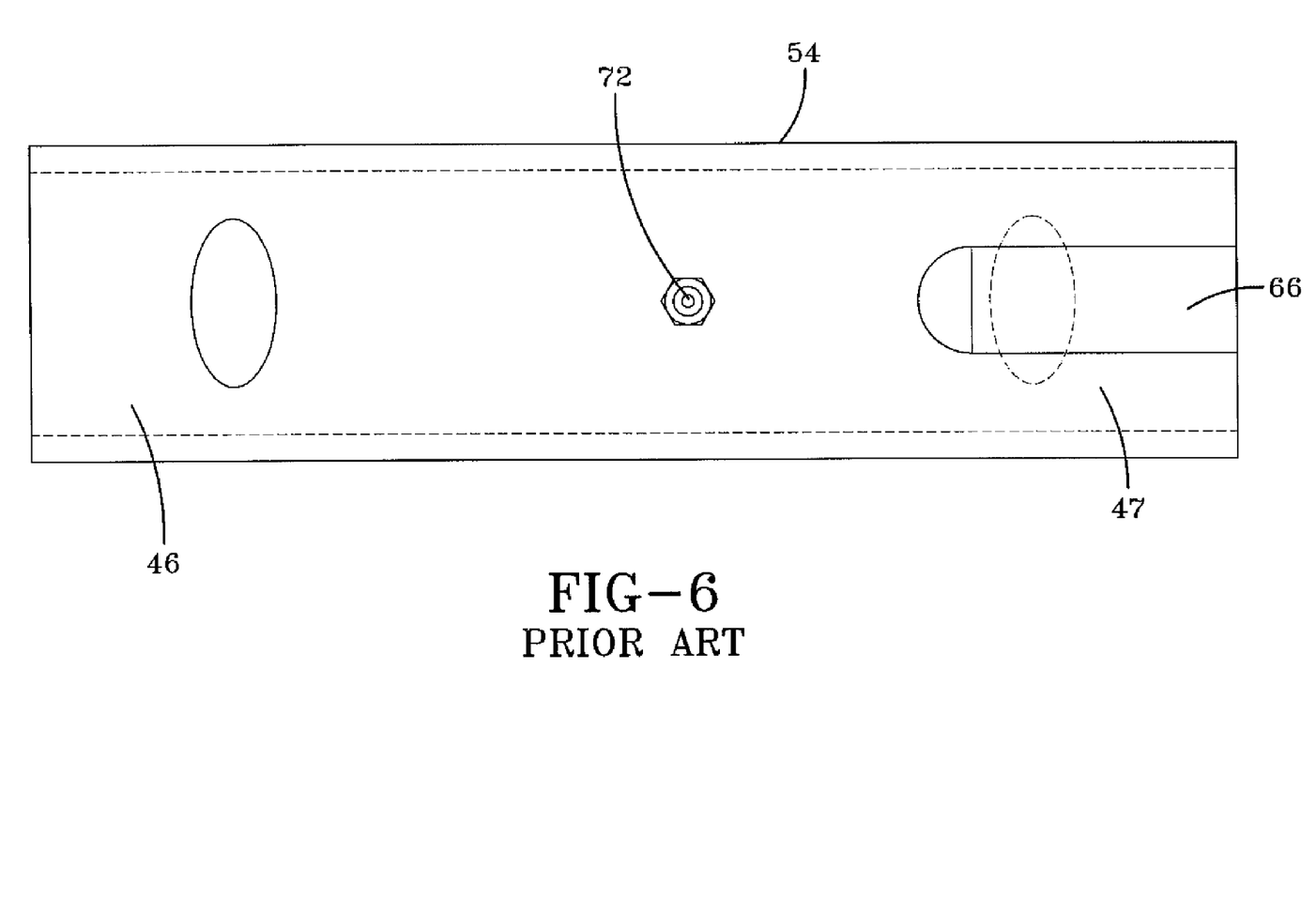
FIG. 6 is an elevational view, with hidden portions shown in phantom lines, of the prior art cam tube of the cam shaft support/enclosure assembly.

A cam shaft support/enclosure assembly 50 is mounted on axle 35 and suspension beam 24 adjacent to each suspension assembly 11. Only one of the cam shaft support/enclosure assemblies 50 will be described hereinbelow, insomuch as the structure and operation of each of the assemblies is similar. More particularly, turning now to FIG. 2, cam shaft support/enclosure assembly 50 includes a cam shaft 52 having an S-cam 53 immovably attached to the outboard end of the cam shaft. A spider 51 is immovably mounted by any suitable means, typically welds, on axle 35 (FIG. 1), and a cam tube 54 is mounted in a bore 55 formed in the cam shaft support/enclosure assembly support end of the spider. More specifically, and as best shown in FIGS. 3, 4 and 6, an outboard end 46 of cam tube 54 is slip-fit in spider bore 55 and abuts shoulder 65 within the spider bore.

Figure 3:
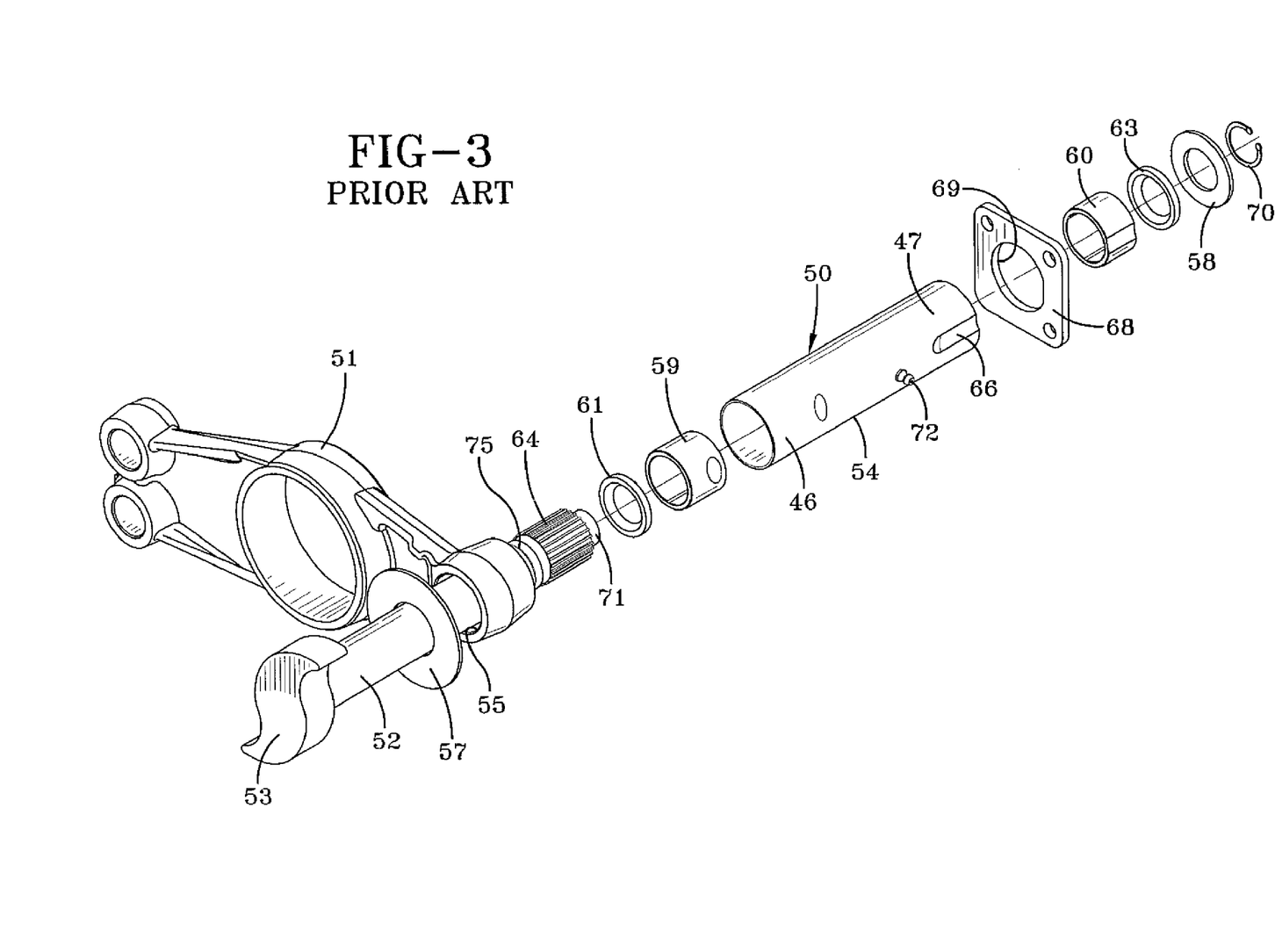
FIG. 3 is a reduced-size exploded view of certain components of the prior art cam shaft support/enclosure assembly shown in FIG. 2.
Figure 4:
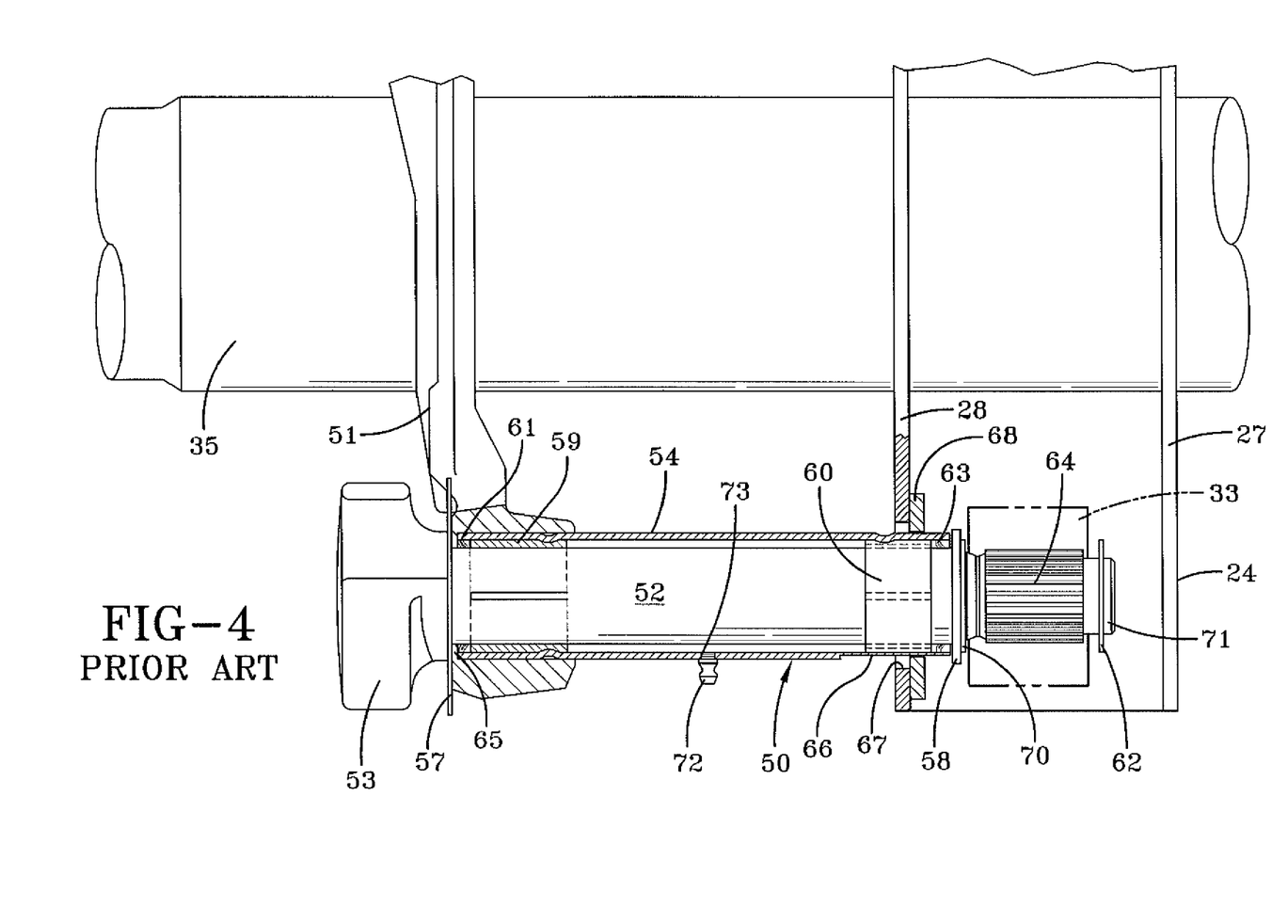
FIG. 4 is fragmentary plan view, with portions broken away and shown in section, and hidden portions represented by dashed lines, of the prior art left-hand cam shaft support/enclosure assembly shown in FIG. 1, and shown mounted on the axle and the suspension beam of the axle/suspension system.
Figure 5:
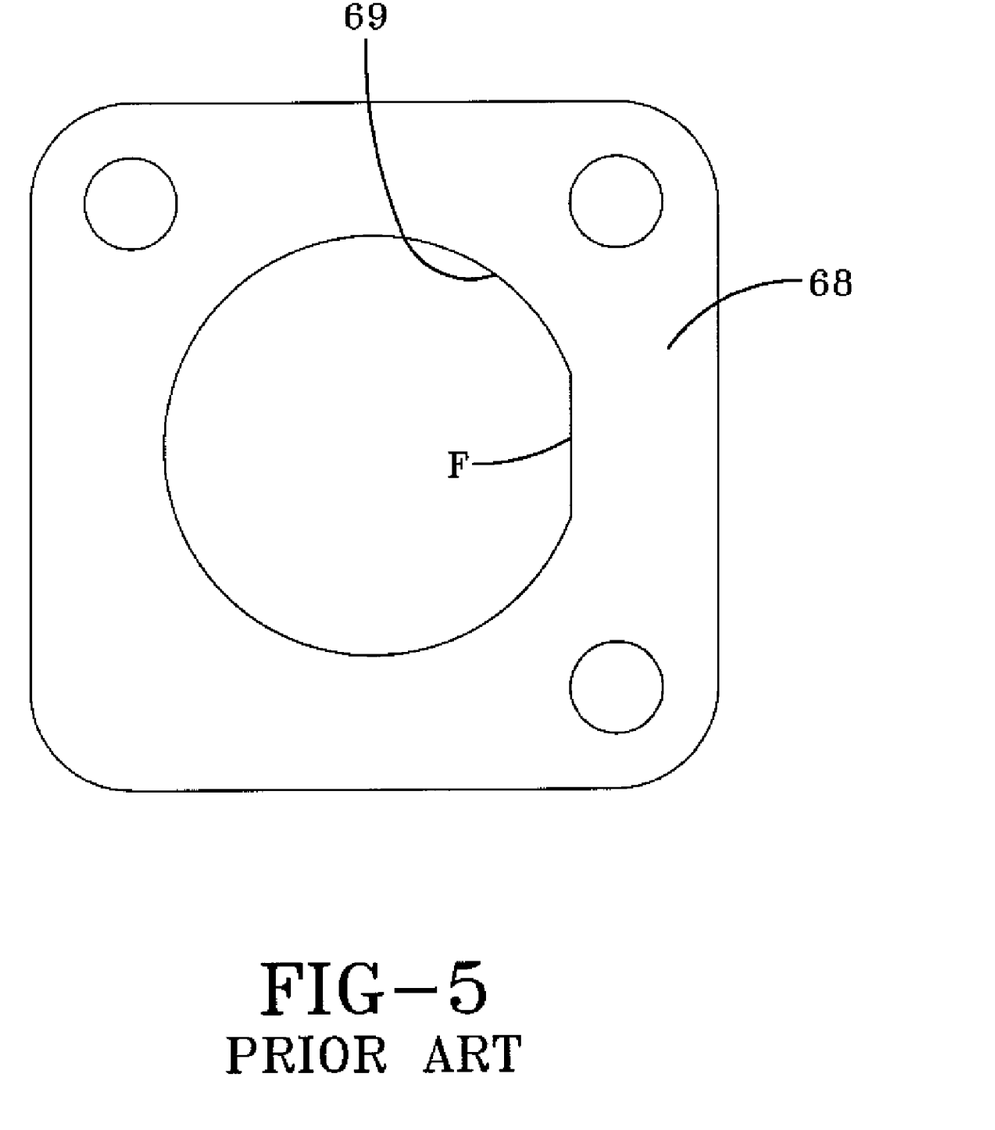
FIG. 5 is an elevational view of the prior art suspension beam cam tube mounting bracket of the cam shaft support/enclosure assembly.

With particular reference to FIGS. 3 and 4, outboard and inboard bushings 59 and 60, respectively, are friction-fit in cam tube outboard and inboard ends 46, 47. An outboard seal 61 is friction-fit in cam tube outboard end 46 and is disposed adjacent to the outboard end of outboard bushing 59 An inboard seal 63 is friction-fit in cam tube inboard end 47 adjacent to the inboard end of inboard bushing 60. Cam shaft 52 is rotatably mounted in and passes completely through outboard and inboard bushings 59, 60 and cam tube 54, so that S-cam 53 is exposed and is located adjacent to cam tube outboard end 46, and a splined inboard end 64 of cam shaft 52 is exposed and is located adjacent to cam tube inboard end 47 A washer 57 is captured about cam shaft 52 between S-cam 53 and spider 51 to prevent friction contact between the S-cam and the spider Inboard end 47 of generally cylindrical-shaped cam tube 54 is formed with a flat 66. With additional reference to FIG. 1, cam tube inboard end 47 passes freely through an opening 67 formed in outboard wall 28 of suspension beam 24, and through an opening 69 formed in a support plate 68. More particularly, support plate 68 is attached to the inboard surface of beam outboard sidewall 28 by any suitable means, such as a floating fastener joint As shown in FIGS. 3 and 5, plate 68 is formed with a correspondingly sized and generally D-shaped opening 69 to slip-fittingly receive cam tube inboard end 47 formed with flat 66.

With reference now to FIGS. 3 and 4, splined inboard end 64 of cam shaft 52 is meshingly engaged with the splined interior surface (not shown) of slack adjuster 33, as is well known to those of ordinary skill in the art. Slack adjuster 33 provides for transfer of in-line loads from brake chamber piston 32 (FIG. 1) into a torsional load on cam shaft 52. A snap ring 62 (FIG. 4) is snappingly engaged in a groove (not shown) formed in a reduced diameter inboardmost end 71 of cam shaft 52. The location of snap ring 62, inboard relative to slack adjuster 33, limits inboard axial movement of the slack adjuster and disengagement from cam shaft 52 Similarly, a washer 58 is captured about cam shaft 52 between cam tube inboard end 47 and slack adjuster 33. A snap ring 70 is snappingly engaged in a groove 75 formed in cam shaft 52 inboard from and adjacent to cam shaft splined inboard end 64. The combination of parts of washer 58 and snap ring 70 prevents cam shaft 52 from moving in an outboard direction any appreciable distance, but also reduces the play of the cam shaft within cam tube 54, which results in improved life of seals 61, 63. Finally, the combination of washer 58 and snap ring 70 also prevents appreciable inboard movement of cam tube 54.

A fitting 72 is mounted in an opening 73 formed in cam tube 54 to enable introduction of a lubricant such as heavy grease into the interior of the cam tube for lubricating cam shaft 52 and bushings 59, 60.

As discussed hereinabove, there are two primary contributors to cam shaft and bushing wear, namely, load-induced wear and contamination-induced wear Load-induced wear is caused by quasi-static and dynamic conditions In the quasi-static case, when the vehicle brakes are applied braking forces are reacted in bushings 59,60. This case is considered quasi-static due to the relatively low rotational speed of cam shaft 52 and the steady state condition when the brakes are held at constant pressure. In this quasi-static state, the load is greater on outboard bushing 59 than on inboard bushing 60. The dynamic load case typically develops when the brakes are in the released condition and cam shaft 52 experiences vibrations due to road inputs. This results in impact loading of cam shaft 52 against bushings 59, 60

Figure 2:
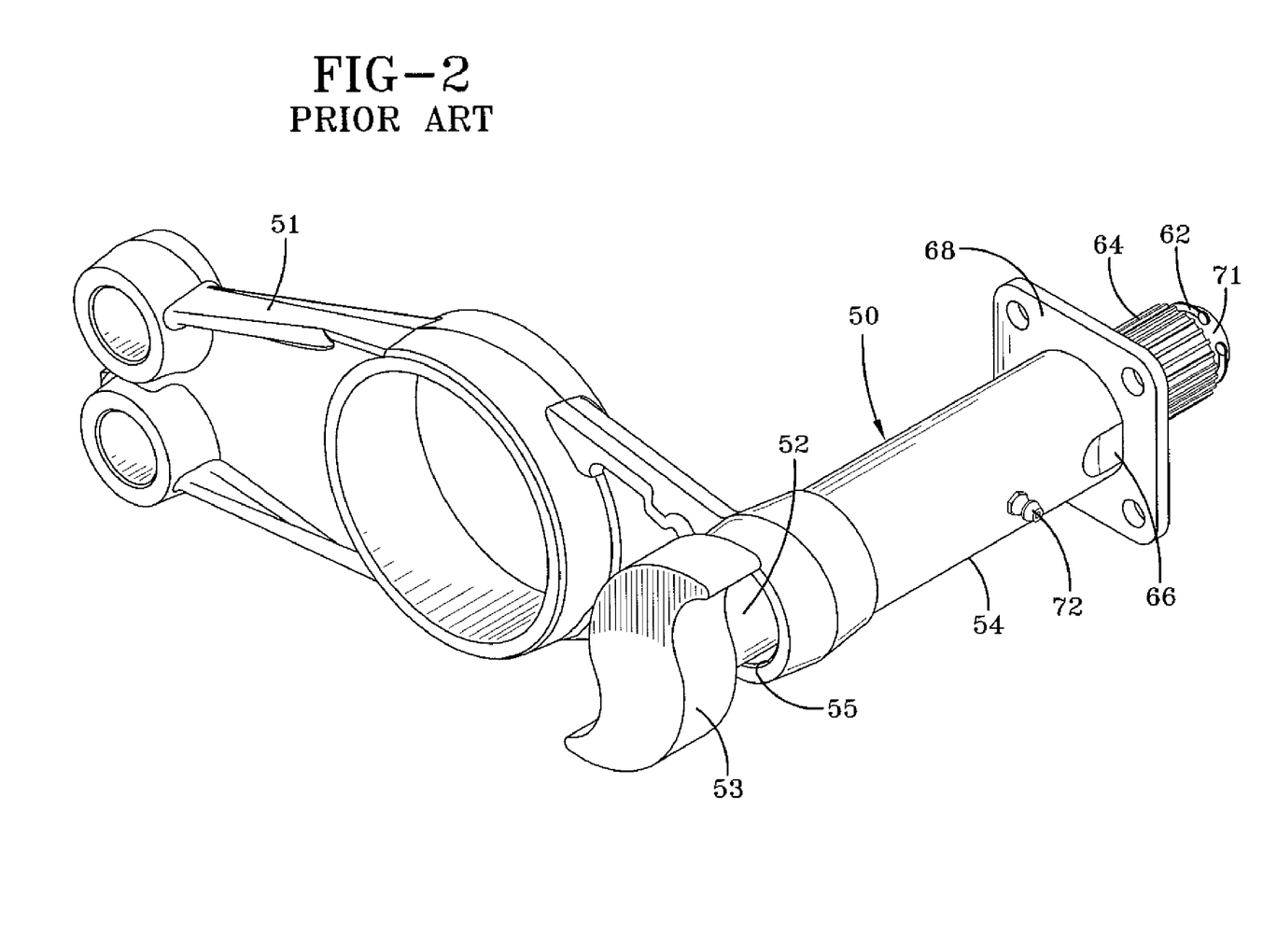
FIG. 2 is an enlarged perspective view of one of the prior art cam shaft support/enclosure assemblies shown in FIG. 1.

However, use of cam tube 54 in cam shaft support/enclosure assembly 50 maintains bushings 59,60 in coaxial relationship to effectively prevent excessive quasi-static and dynamic loads on the bushings More particularly, this arrangement of parts prevents excessive rotational friction or binding of cam shaft 52 against one or more of bushings 59,60, during brake actuation, and also improves the load support of the bushings. That is, loads are more evenly distributed across the surfaces of both bushings 59,60 and there is a reduced chance of cam shaft 52 contacting a small area or edge of one of the bushings. The load-beating area also is increased for cam shaft 52 which contributes to reduced wear of bushings 59,60. Moreover, use of cam tube 54 eliminates two seal interfaces and reduces by two the possible points of ingress of contamination into cam tube 54 as compared to bushings used without a tube Cam tube 54 also provides a larger grease reservoir to assist in trapping and diluting any contaminants that may migrate past the seals Support plate 68 formed with D-shaped opening 69 is meant to prevent rotation of cam tube 54 induced by rotation of cam shaft 52. More specifically, as shown in FIGS. 2 and 5, flat 66 formed in cam tube 54 engages the flat portion F of support plate opening 69 and is meant to react torsional loads imparted by the tube Support plate 68 is an improvement over many prior art cam shaft support/enclosure assembly designs in which the cantilevered cam tube is welded to a suspension beam support plate, because such welds are susceptible to fatigue and failure due to the many loads reacted by the plate. While support plate 68 eliminates the possibility of weld fatigue or failure because it is free of welds, further room for improvement exists in minimizing or preventing the rotation and/or axial movement of cam tube 54.

An exemplary embodiment of the cam tube support plate or bracket of the present invention is indicated generally at 80 and is shown in FIGS. 7 and 8 The environment in which improved cam tube bracket 80 of the present invention operates generally is similar to that described above for prior art support plate 68, with any differences in structure and operation between the environment adapted for use with the present invention and that of prior art support plates being particularly described below. Inasmuch as a pair of cam tube brackets 80 are utilized on an axle/suspension system (not shown), but are generally identical in structure and operation, only one will be described herein.

Figure 7A:
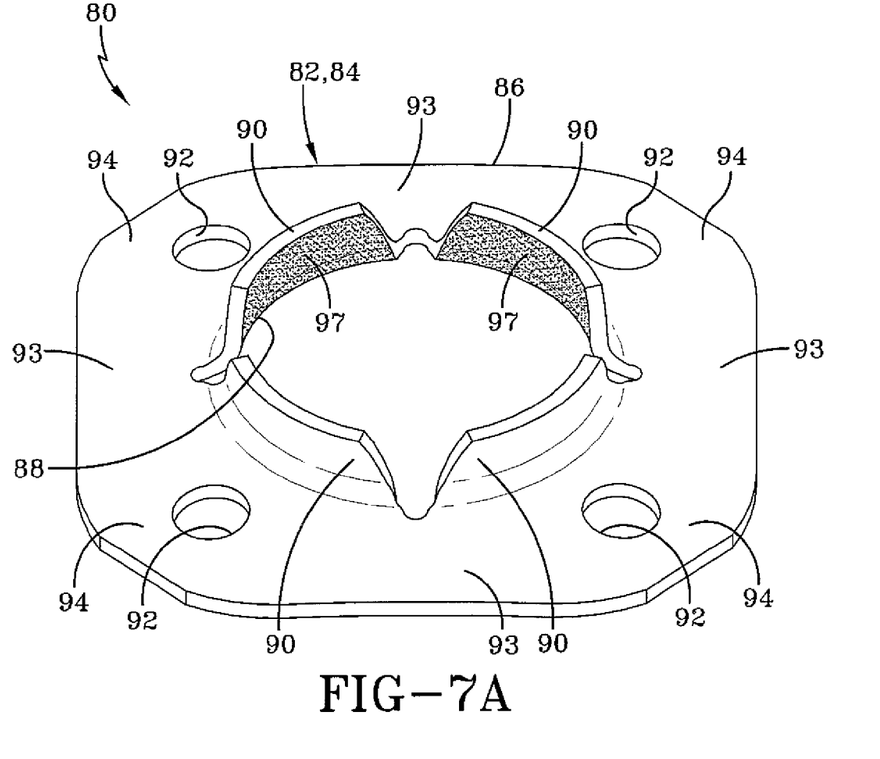
FIG. 7A is a perspective view of one-half of the cam tube bracket of an exemplary embodiment of the present invention.
Figure 8A:
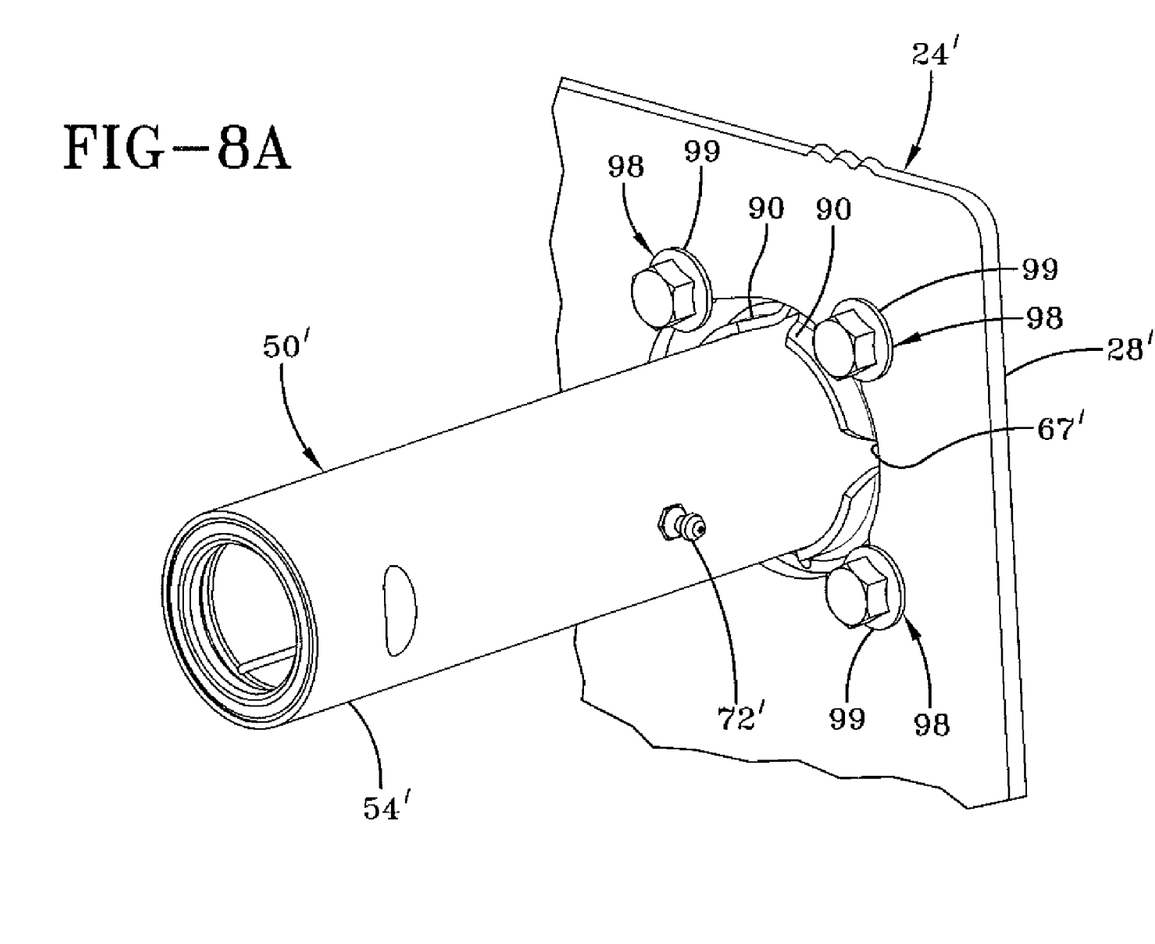
FIG. 8A is a fragmentary perspective view of an exemplary embodiment of the assembled cam tube bracket of the present invention shown mounted on a portion of a suspension assembly beam and securing a cam tube in place.
Figure 8B:
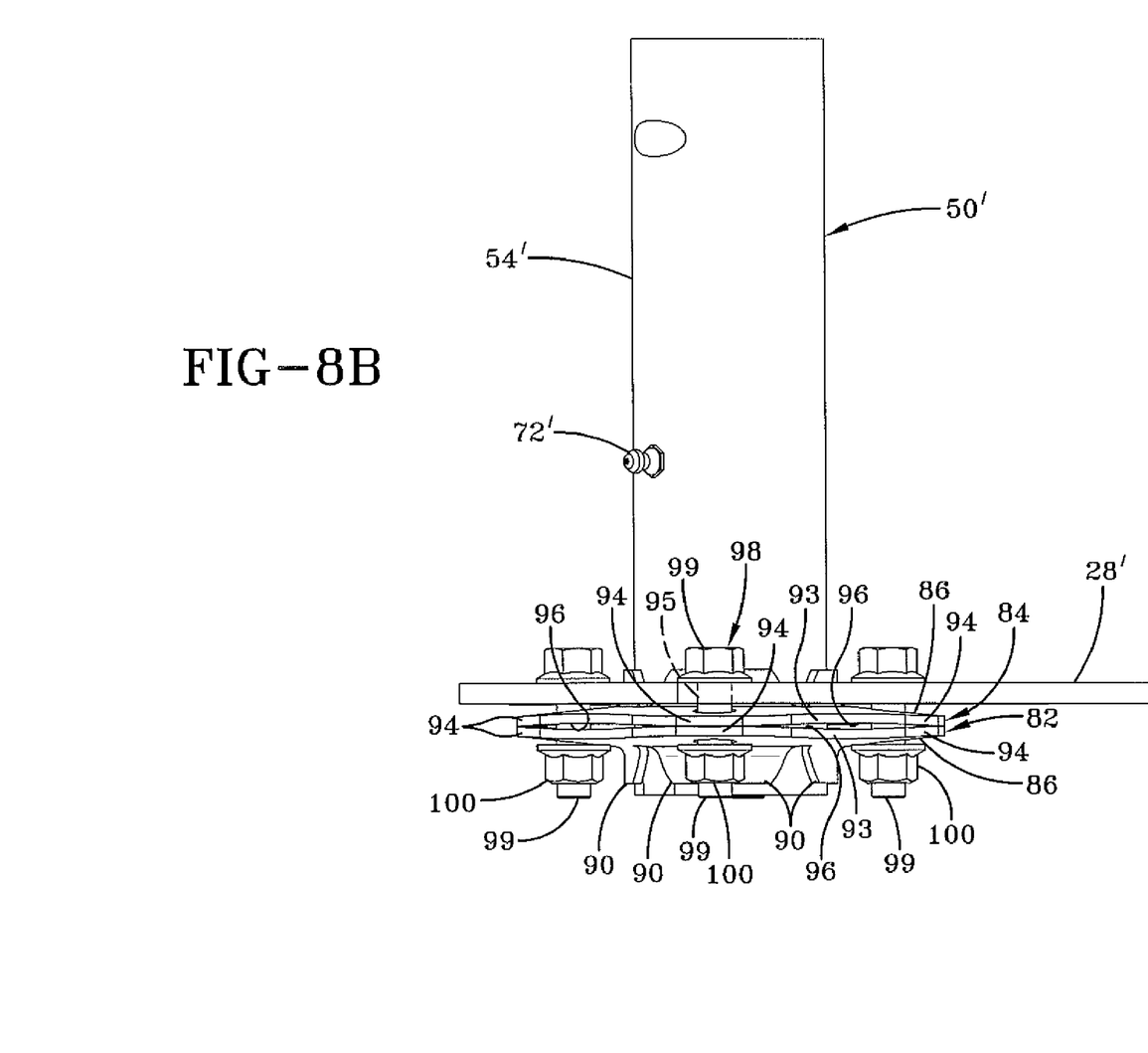
FIG. 8B is a fragmentary elevational view of the cam tube bracket shown in FIG. 8A, with hidden portions represented by dashed lines.

Specifically, and with reference now to FIGS. 7A and 8B, improved cam tube bracket 80 includes an inboard plate 82 and an outboard plate 84, which are generally identical Each plate 82,84 preferably is extruded and constructed of a durable metal such as steel, though it is contemplated that other production methods and/or durable materials could also be used without affecting the overall concept or operation of the present invention. For example, plates 82,84 also can be made of other materials such as iron or sheet metal, and/or produced by other methods such as casting or forging. Inasmuch as inboard plate 82 and outboard plate 84 generally are identical in structure and operation, only one will be described herein.

With particular reference to FIG. 7A, in the exemplary embodiment of the present invention, inboard plate 82 comprises a base plate 86 that is generally square and slightly concave in an inboard direction, as opposed to flat. Base plate 86 is formed with an opening 88 located therein for receipt of cam tube 54' (FIG. 8A), and with four generally equally-spaced tabs 90 which extend outwardly from the base plate along the circumference of opening 88. Each plate 82,84 preferably has four sides 93 and four corners 94 and is concave such that when positioned in series along cam tube 54', with tabs 90 extending in opposite inboard and outboard directions, respectively, each one of corners 94 of inboard plate 82 is in contact with a corresponding corner 94 of outboard plate 84, so that a space or gap 96 exists between adjacent sides 93 of inboard plate 82 and outboard plate 84, as best illustrated in FIG. 8B An opening 92 is formed in each corner 94 of each base plate 86 of plates 82,84, and respective pairs of the openings are aligned for receipt of a fastener 98, as described more fully below. The opening 88 formed in each one of inboard and outboard plates 82,84 is slightly oversized and aligned for receipt of cam tube 54'.

Figure 7B:
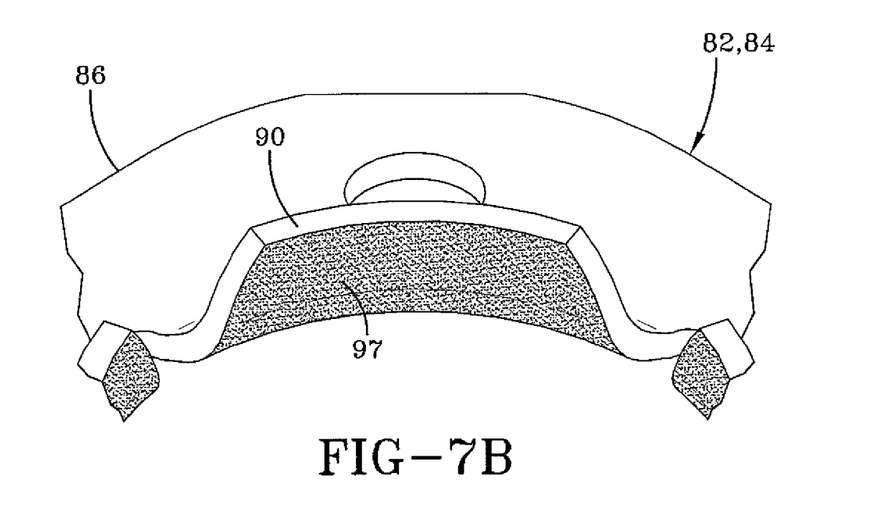
FIG. 7B is a greatly enlarged fragmentary perspective view of the preferably roughened surface of the extruded tabs of the bracket shown in FIG. 7A.

With reference to FIGS. 7A and 7B, each one of tabs 90 further- comprises a generally arched face 97 for mating with the outer surface of cam tube 54' (FIG. 8A). The surface of face 97 is preferably textured, that is, consistently roughened or scored, so as to increase the coefficient of friction between the face and the exterior surface of cam tube 54' when properly installed, which in turn reduces fretting of the interfaces of the cam tube with tabs 90 In addition, the above-described structure and arrangement of parts increases resistance to torsional and axial deflection of cam tube 54', thus providing a more secure attachment of the tube to the suspension beam. It is contemplated that the coefficient of friction between each tab face 97 and the exterior surface of cam tube 54' also can be increased by texturing or roughening the exterior surface of cam tube 54' in those locations that will directly contact face 97 upon installation. The toughened or scored surfaces on face 97 and/or on the exterior surface of cam tube 54' can be obtained by traditional means known in the air such as through the use of a die with a roughened face to form tab 90 and tab face 97, or by spraying face 97 with a substance to create a generally rough finish such as a plasma spray or epoxy paint with an abrasive additive.

The preferred use of four tabs 90, each comprising an arc of approximately 90 degrees, also adds to the radial fictional forces exerted on cam tube 54', when compared to known prior art support plates or brackets which utilize only two tabs, each comprising an art of approximately 180 degrees, which increases the load capacity at the interface of tube 54' and bracket 80. Alternatively, three tabs 90 may be used, in which case each tab comprises an arc of approximately 120 degrees, which adds to the radial frictional forces on cam tube 54' when compared to prior art brackets which utilize only two tabs It also is contemplated that three or more tabs 90 may be used without any specific texturing or roughening, since it has been discovered that increasing the number of tabs from two to three or more, thereby reducing the arcuate length of each tab from 180 degrees to 120 degrees or less, enables each tab to exhibit spring-like behavior. Such spring-like behavior provides more uniform force distribution, increasing the net resistance force of each tab 90, thereby enabling the tabs to grip the surface of cam tube 54' in an improved manner over the prior art, even without texturing or roughening of tab faces 97 or cam tube 54'. Of course, depending on design considerations, three or more tabs 90 may be used with texturing or roughening of at least one selected tab face 97 without affecting the overall concept or operation of the invention. Such structural features result in improved life of cam shaft support/enclosure assembly 50'.

It is further contemplated that less than three tabs can be used, such as one or two, without affecting the overall concept of the invention. This is accomplished by texturing or roughening face 97 of tabs 90 and/or by texturing or roughening the outer surface of cam tube 54'. Such texturing or roughening allows tabs 90, numbering fewer than three, to grip the surface of cam tube 54' in an improved manner over the prior art.

It is even further contemplated that one plate having at least one tab could be utilized without affecting the overall concept or operation of the invention, whereby the plate and the tab are designed to engage the outer surface of the cam tube to minimize movement of the cam tube.

Having described the structure and arrangement of parts of the preferred embodiments of improved cam tube bracket 80 of the present invention, the installation and function of the cam tube bracket now will be described. More specifically, cam tube 54' can be positioned in an inboard or an outboard direction to account for manufacturing variances in the distance between the two main support points for the tube, namely spider 51' (FIG. 1) and suspension beam outboard sidewall 28' of beam 24'. Thus, custom welding or shimming is not required during assembly of cam shaft support/enclosure assembly 50' to account for such variances. Improved cam tube bracket 80 is installed along cam tube 54' by inserting the end of the cam tube into openings 88 of outboard plate 84 and inboard plate 82 during the installation of cam shaft support/enclosure assembly 50' on an axle/suspension system.

More specifically, turning to FIGS. 8A and 8B, outboard plate 84 is positioned adjacent to the inboard surface of outboard sidewall 28' such that tabs 90 are inserted into opening 67' formed in outboard sidewall 28' between the outboard sidewall and cam tube 54'. Inboard plate 82 is positioned adjacent to outboard plate 84 along cam tube 54' such that each corner 94 of the inboard plate is in contact with a corresponding corner 94 of the outboard plate, and tabs 90 of the inboard and outboard plates are facing in opposite inboard and outboard directions respectively, as shown in FIG. 8B As a result, tabs 90 of outboard plate 84 face generally outboardly and the tabs of inboard plate 82 face generally inboardly. It is also contemplated that outboard plate 84 could be positioned adjacent to the outboard surface of outboard sidewall 28', and inboard plate 82 positioned adjacent to the inboard surface of outboard sidewall 28', therefore sandwiching the sidewall between the inboard and the outboard plates, without affecting the overall concept of operation of the present invention. It is even further contemplated that both outboard plate 84 and inboard plate 82 could be positioned adjacent to the outboard surface of outboard side wall 28', without affecting the overall concept or operation of the present invention It also is contemplated that plates 82,84 could be attached or mounted to the axle of the axle/suspension system without affecting the overall concept of the present invention Opening 88 formed in each one of inboard and outboard plates 82, 84 is slightly oversized to allow for easy installation on cam tube 54' and to permit alignment of each of openings 92 in inboard plate 82 and outboard plate 84 with a corresponding opening 95 in outboard wall 28' for receipt of a fastener 98 In the preferred embodiments, each of fasteners 98 is comprised of a bolt 98 and a nut 100, but it is contemplated that other types of fastener's can also be used to attach improved cam tube bracket 80 to outboard wall 28' without affecting the overall concept of the invention In accordance with another important feature of the present invention, as fasteners 98 are tightened and inboard plate 82 and outboard plate 84 are removably attached to outboard wall 28', base plates 86 of the inboard and outboard plates are drawn together and flattened, which in turn eliminates gaps 96 which had been created by the concave shape of each of the base plates More specifically, as fasteners 98 are tightened and inboard and outboard plates 82,84 are drawn together, each of tabs 90 are forced radially inwardly into mating contact with the circumference of cam tube 54'. That is, when cam tube 54' is inserted into inboard and outboard plates 82,84, there is a slip-fit between the cam tube and the inboard and outboard plates. When fasteners 98 are tightened, inboard and outboard plates 82,84 engage cam tube 54' in a press-type fit. More particularly, the radially inward movement of tabs 90 exerts a radial force on the exterior surface of cam tube 54' such as to create a press-type fit between improved cam tube bracket 80 and cam tube 54' The increased radial force, which may be combined with the preferably increased coefficient of friction of the roughened surface of each of faces 97, serves to increase the fiction between cam tube 54' and improved cam tube bracket 80, which in turn collectively increases the load capacity of the cam tube-bracket interface, increases resistance to axial or rotational movement of the cam tube, reduces fretting, and provides for a more secure attachment and extended life of cam shaft support/enclosure assembly 50'

While other prior art cam tube brackets such as a two-tabbed bracket having smooth tab faces perform their intended function, the present invention cam tube bracket utilizing three or more tabs 90, such as four tabs, which each may have a roughened face 97, increases the coefficient of friction between tabs 90 and cam tube 54'. This in turn increases the resistance of cam tube 54' to movement, resulting in prevention of fretting of the interface between the tube and bracket 80 More specifically, cam tube bracket 80 of the present invention exhibits about a 100 percent improvement in minimizing movement of the cam tube over prior art brackets having two smooth tabs, resulting in a more active attachment of the tube to suspension beam 24' It is believed that this improvement in the performance of, for example, four-tab cam tube bracket 80 of the present invention over such two-tab prior art brackets is due to a more uniform loading on cam tube 54' in that the four tab structure provides a spring effect that better applies pressure to oval or slightly distorted tubes which are not precisely cylindrical, thus increasing the load capacity of the cam tube/cam tube bracket interface Notwithstanding such improvement realized by a four tab arrangement, as described above, it is also contemplated that a three tab arrangement could be used, with each tab having an approximately 120 degree arc, without affecting the overall concept or operation of the present invention It is understood that use of three tabs also provides a similar spring effect and also increases the load capacity of the cam tube/cam tube bracket interface. The above advantages also contribute to extending the life of cam shaft support/enclosure assembly 50'.

It should be appreciated that other geometric shapes of plates 86, openings 88 and 92 formed in the plates, tabs 90, and the corresponding shape of cam tube inboard end 47 engaging the plates can be utilized without affecting the overall concept or operation of the present invention It is understood that fastening means other than fastener 98 could be employed. It should also be appreciated that cam tube support bracket 80 can be utilized in connection with other types of cam shaft support/enclosure assemblies than shown and described herein, and in connection with axle/suspension systems other than the type shown and described, as well as on all types of heavy-duty vehicles and other types of brake systems such as a system where the spider extends frontwardly, without effecting the overall concept or operation of the present invention The present invention has been described with reference to a specific exemplary embodiment. It shall be understood that this illustration is by way of example and not by way of limitation. Potential modifications and alterations will occur to others upon a reading and understanding of this disclosure, and it is understood that the invention includes all such modifications and alterations and equivalents thereof Accordingly, the improved cam tube bracket is simplified, provides an effective, safe, inexpensive, and efficient structure which achieves all the enumerated objectives, provides for eliminating difficulties encountered with prior art cam tube brackets, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cam tube bracket is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A bracket for a cam tube of a brake system cam shaft support/enclosure assembly, said cam shaft support/enclosure assembly being attached to an axle/suspension system of a heavy-duty vehicle, said bracket comprising:

at least one plate mounted on said axle/suspension system, said plate being generally concave and formed with an opening for receiving said cam tube and including at least three tabs extending from said plate adjacent to said cam tube opening, each one of said at least three tabs having a face for mating with an outer surface of said cam tube, said plate further including at least two fastener openings, each one of said fastener openings being radially aligned with and adjacent to an intermediate portion of respective ones of a pair of said at least three tabs, whereby upon receipt of said cam tube and passage of a mechanical fastener through each one of said fastener openings, said plate is generally flattened and at least said pair of tabs matingly engages said cam tube outer surface so that movement of said cam tube is minimized.

2. The bracket for a cam tube of a brake system cam shaft support/enclosure assembly of claim 1, wherein said bracket includes two plates, said bracket mounted on a beam of said axle/suspension system.

3. The bracket for a cam tube of a brake system cam shaft support/enclosure assembly of claim 2, wherein said plates are opposed to one another.

4. The bracket for a cam tube of a brake system cam shaft support/enclosure assembly of claim 1, wherein said tabs include a generally arched face, at least one selected tab face having a surface texture.

5. The bracket for a cam tube of a brake system cam shaft support/enclosure assembly of claim 1, wherein said cam tube outer surface has a surface texture.

6. The bracket for a cam tube of a brake system cam shaft support/enclosure assembly of claim 1, wherein said tabs extend outwardly from said plate.

* * * * *